(12) United States Patent
Lin

(10) Patent No.: US 7,802,820 B2
(45) Date of Patent: Sep. 28, 2010

(54) BOOK WITH EMBOSSED LEAVES

(75) Inventor: Richard Lin, Sijhih (TW)

(73) Assignee: Pop Three Dimensional Picture Co., Ltd., Taipei County (TW)

( * ) Notice: Subject to any disclaimer, the term of this patent is extended or adjusted under 35 U.S.C. 154(b) by 453 days.

(21) Appl. No.: 12/068,293

(22) Filed: Feb. 5, 2008

(65) Prior Publication Data

US 2009/0121469 A1    May 14, 2009

(30) Foreign Application Priority Data

Nov. 9, 2007    (TW) .............................. 96218999 U

(51) Int. Cl.
*B42D 1/00*    (2006.01)
(52) U.S. Cl. ...................................................... 281/38
(58) Field of Classification Search ............. 281/38–40; 216/28–29, 52, 7
See application file for complete search history.

(56) References Cited

FOREIGN PATENT DOCUMENTS

| GB | 349672 | 6/1931 |
|----|--------|--------|
| GB | 734391 | 7/1955 |
| GB | 1250059 | 10/1971 |

*Primary Examiner*—Dana Ross
*Assistant Examiner*—Matthew G Katcoff
(74) *Attorney, Agent, or Firm*—Muncy, Geissler, Olds, & Lowe, PLLC

(57) ABSTRACT

A book includes a book body and at least one leaf. The book body is provided with two spaced folding lines to divide an outer side of the book body into a front face, a back face, and a spine interconnecting the front and the back face, and an inner side of the book body into a first and a second inner surface corresponding to the front and the back face, respectively, and a connecting surface corresponding to the spine and interconnecting the first and the second inner surface. The leaf is attached to one of the first and the second inner surface, and includes an illustration printed on a top surface of the leaf, a first embossed portion corresponding to the illustration, and at least one second embossed portion spaced from and higher than the first embossed portion to protect the latter against collapse by external pressure.

7 Claims, 8 Drawing Sheets

US 7,802,820 B2

BOOK WITH EMBOSSED LEAVES

RELATED APPLICATIONS

This application claims priority to Taiwan Application Serial Number 96218999, filed Nov. 9, 2007, which is herein incorporated by reference.

FIELD OF THE INVENTION

The present invention relates to a book, and more particularly, to a book with embossed leaves that shows unique beauty and good applicability and is easy and convenient to store and carry.

BACKGROUND OF THE INVENTION

An existing technique for a flat picture to leave a lively and vivid impression on a viewer is to produce embossed portions on different colored or tinted areas of the picture by vacuum forming, so that such colored or tinted areas are raised by different heights to create a three-dimensional rich visual effect. Such embossed picture is so beautiful, unique, and attractive that it has been widely applied in different products, such as in a book to produce embossed illustrations on leaves of the book.

However, since such embossed illustration or picture formed on books or other products is raised outward and tends to become collapsed and damaged by external pressure applied thereto, a user must take special care to store the books or products when they are not in use. Moreover, to avoid two or more overlapped embossed illustrations or pictures from damage due to mutual compression, books or other products with such embossed illustrations or pictures having a quite large size are not suitable for folding and thereby could not be conveniently carried or stored.

SUMMARY OF THE INVENTION

A primary object of the present invention is to provide a book with embossed leaves that shows unique beauty and good applicability and is easy and convenient to store and carry.

To achieve the above and other objects, the book with embossed leaves according to the present invention includes a book body and at least one embossed leaf. The book body has opposite outer and inner side, and two spaced folding lines provided thereon at predetermined positions, so that the two folding lines divide the outer side into a front face, a back face, and a spine interconnecting the front and the back face, and the inner side into a first and a second inner surface corresponding to the front and the back face, respectively, and a connecting surface corresponding to the spine and interconnecting the first and the second inner surface. The leaf is attached to one of the first and the second inner surface, and includes an illustration printed on a top surface of the leaf, a first embossed portion produced by vacuum forming and corresponding to the illustration, and at least one second embossed portion produced by vacuum forming to space from the first embossed portion. The second embossed portion has a height larger than that of the first embossed portion, so as to protect the first embossed portion against collapse by external pressure.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
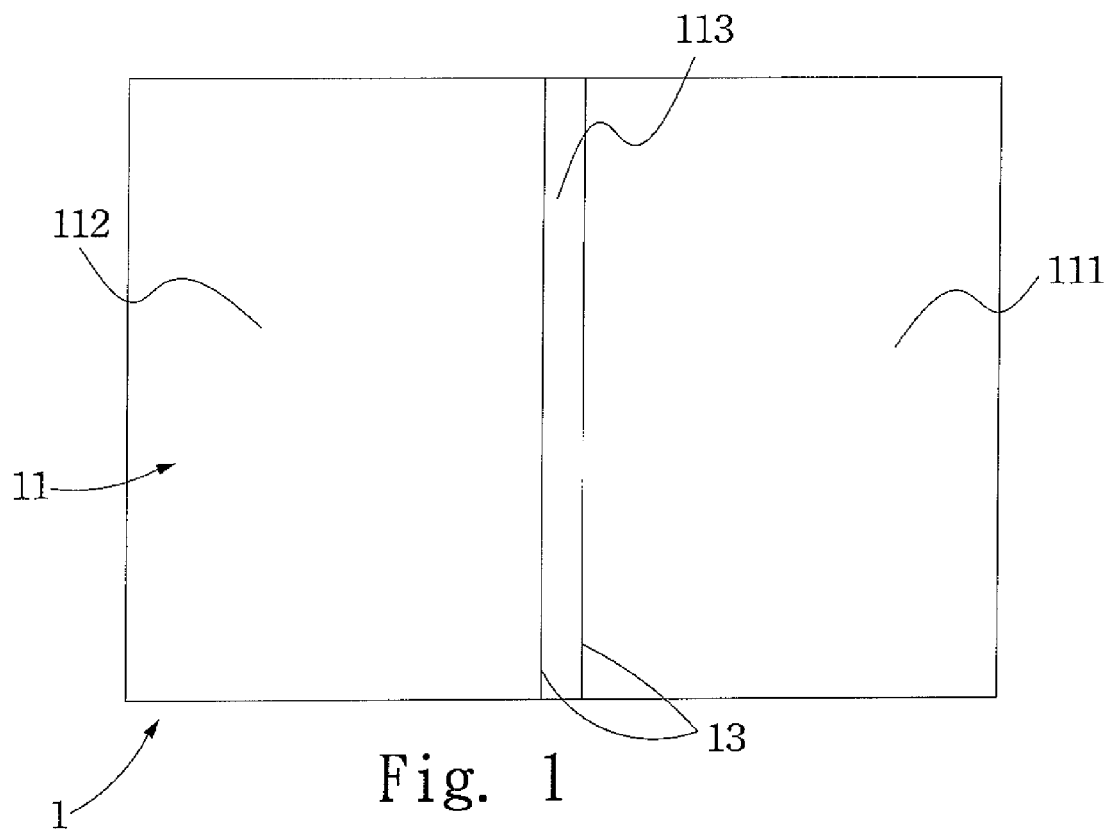
FIG. 1 is an assembled bottom view of a book with embossed leaves according to a first preferred embodiment of the present invention in an opened state.

A book with embossed leaves according to the present invention is now described with some preferred embodiments thereof. For the purpose of clarity and conciseness, similar elements in different embodiments are denoted by the same reference numerals.

Figure 2:
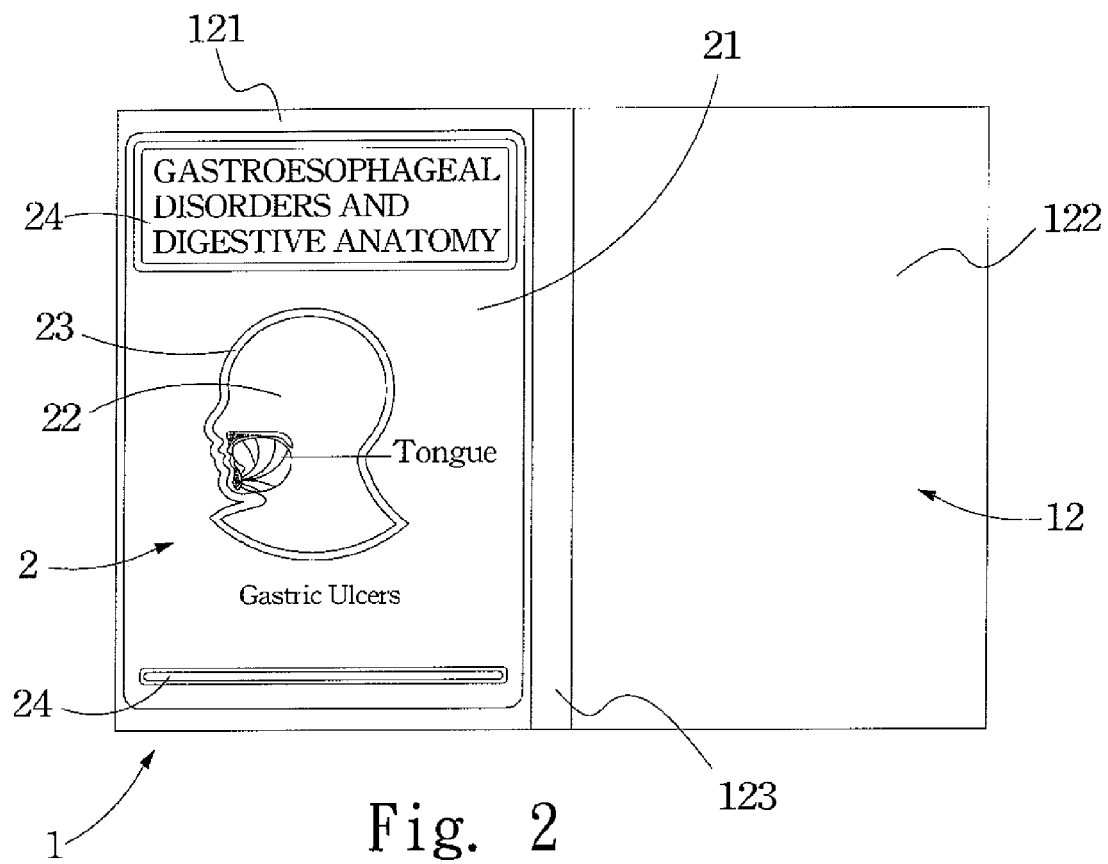
FIG. 2 is top view of FIG. 1 showing only one embossed leaf is included in the book.
Figure 3:
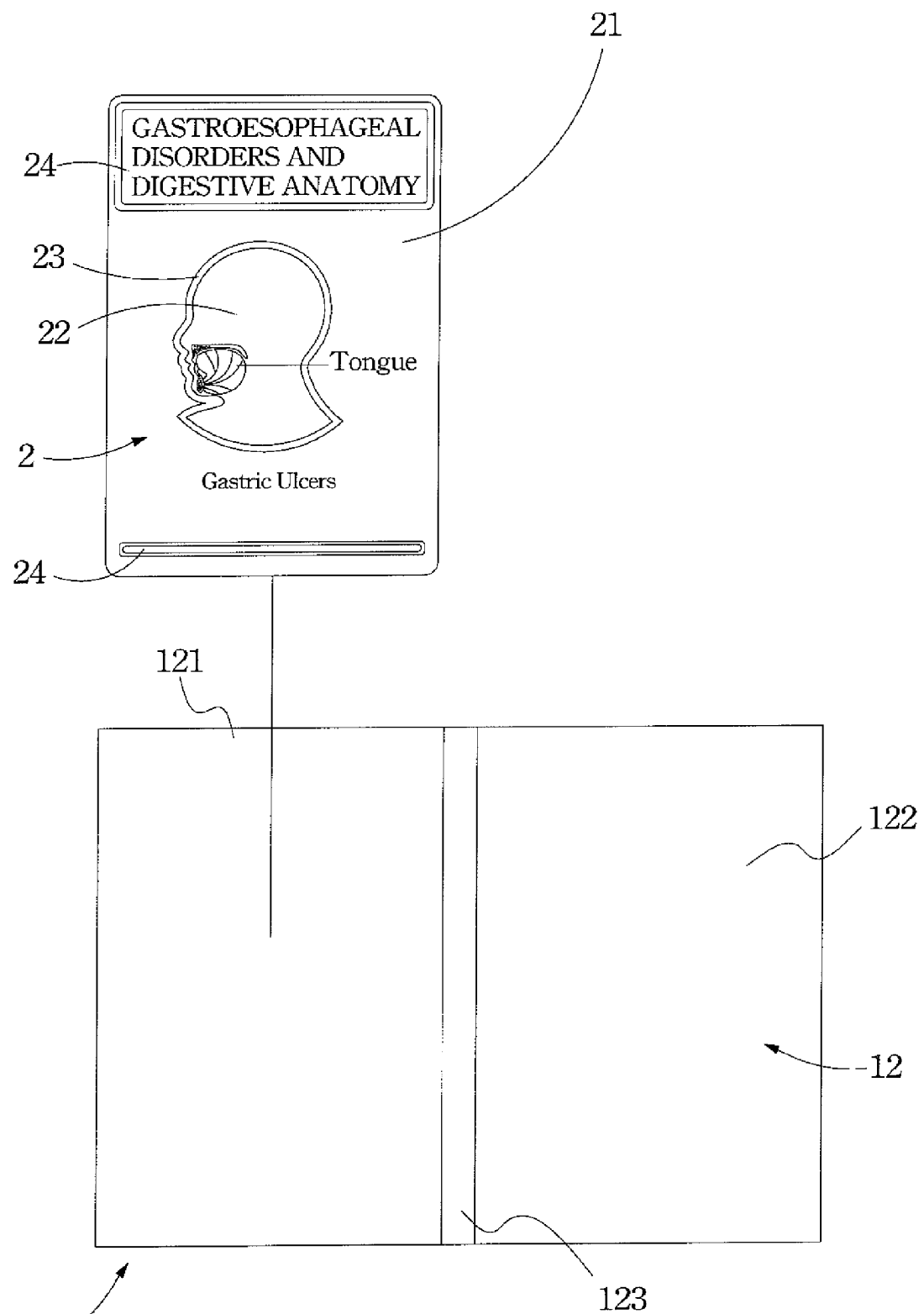
FIG. 3 is an exploded view of FIG. 2.

Please refer to FIGS. 1, 2, and 3. A book with embossed leaves according to a first preferred embodiment of the present invention includes a book body 1 and at least one leaf 2. In the illustrated first embodiment in FIG. 2, there is only one leaf 2.

The book body 1 includes two opposite sides, namely, an outer side 11 and an inner side 12; and two spaced folding lines 13 formed at predetermined positions on the book body 1 by pressing, for example. With the two folding lines 13, the outer side 11 of the book body 1 is divided into a front face 111, a back face 112, and a spine 113 interconnecting the front face 111 and the back face 112. The two folding lines 13 also divide the inner side 12 of the book body 1 into a first inner surface 121 corresponding to the front face 111, a second inner surface 122 corresponding to the back face 112, and a connecting surface 123 corresponding to the spine 113 and interconnecting the first and the second inner surface 121, 122.

Figure 4:
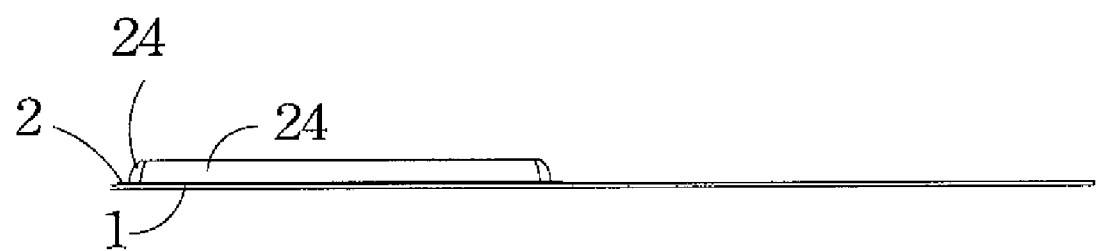
FIG. 4 is an end view of FIG. 2.
Figure 5:
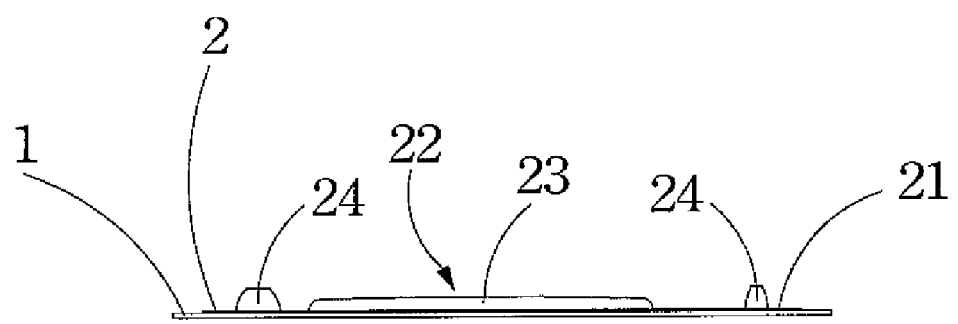
FIG. 5 is a side view of FIG. 2.
Figure 6:
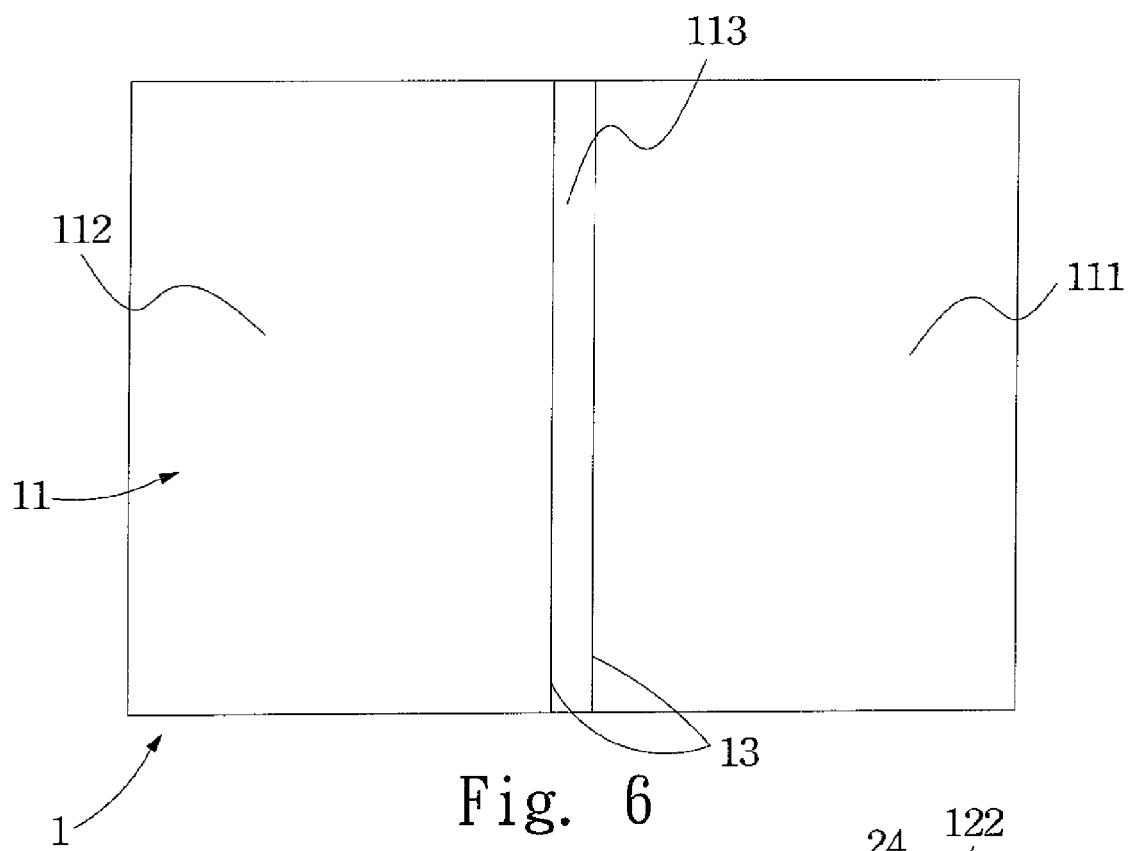
FIG. 6 is an assembled bottom view of a book with embossed leaves according to a variation of the first preferred embodiment of the present invention in an opened state.
Figure 7:
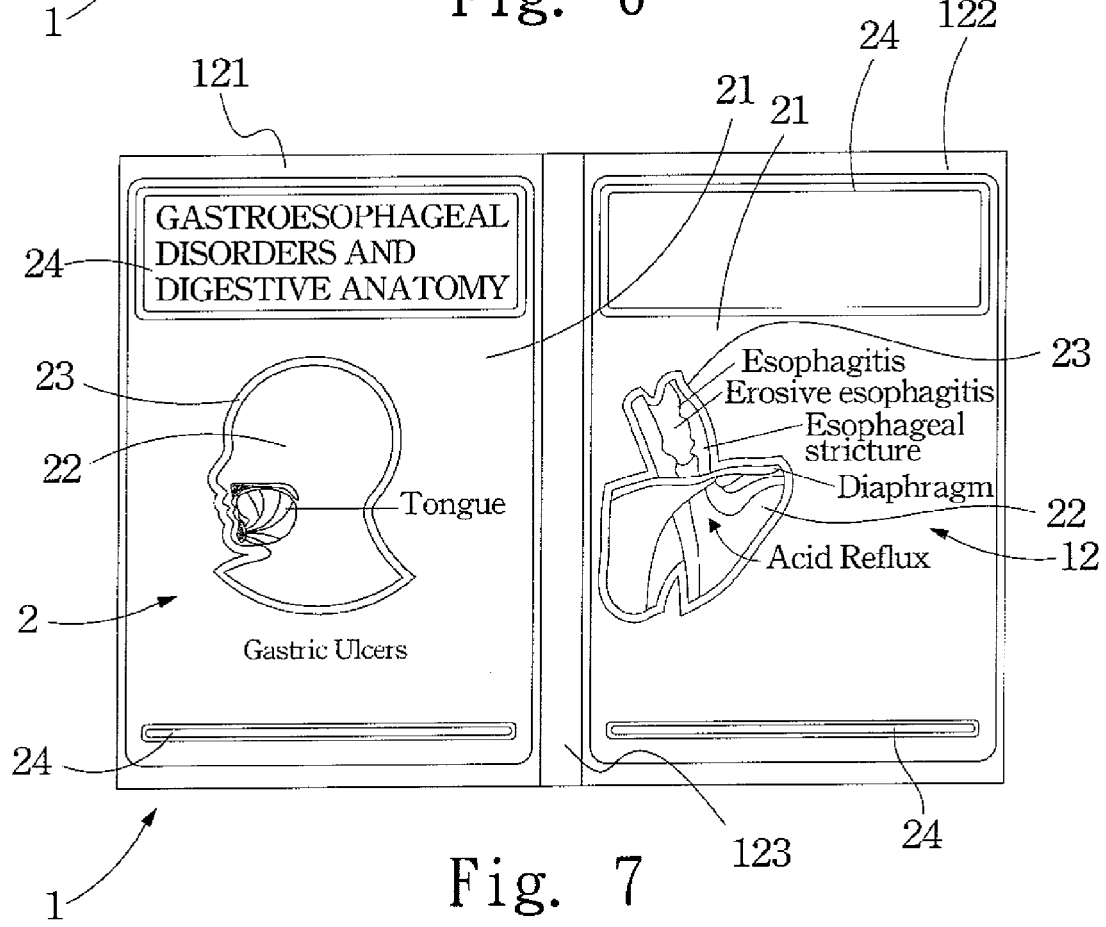
FIG. 7 is a top view of FIG. 6 showing two embossed leaves are included in the book.
Figure 8:
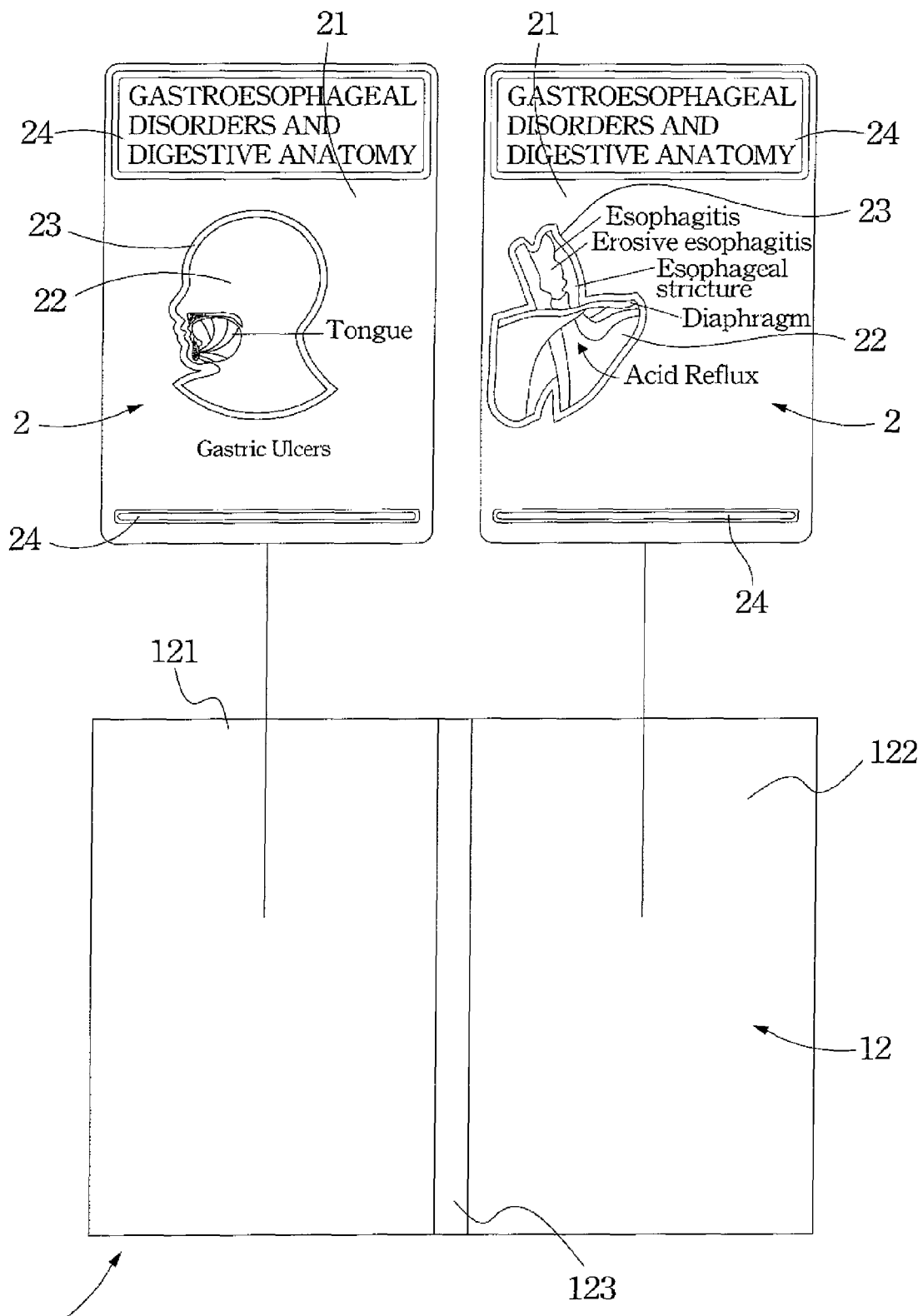
FIG. 8 is an exploded view of FIG. 7.
Figure 9:
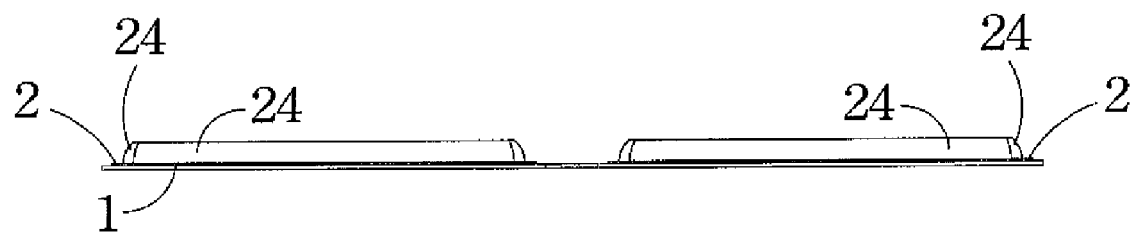
FIG. 9 is an end view of FIG. 7.
Figure 10:
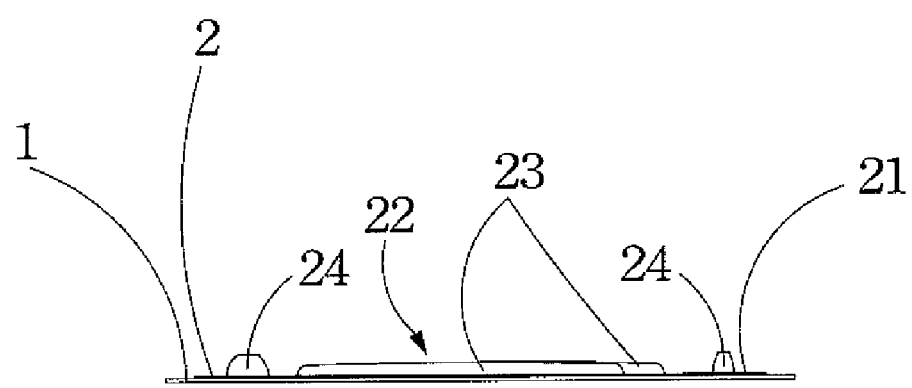
FIG. 10 is a side view of FIG. 7.

Please also refer to FIGS. 4 and 5 along with FIGS. 1 to 3. The leaf 2 is attached to one of the first and the second inner surface 121, 122. In the illustrated first preferred embodiment, the leaf 2 is fixedly bonded to the first inner surface 121. The leaf 2 includes an illustration 22 printed on a top surface 21 thereof, a first embossed portion 23 integrally produced on the leaf 2 by vacuum forming to raise from the top surface 21 and correspond to the illustration 22, and two spaced second embossed portions 24 also integrally produced on the leaf 2 by vacuum forming to raise from the top surface 21 and preferably locate at two opposite sides of the first embossed portion 23, such as the upper and the lower side of the first embossed portion 23 as shown in FIG. 2.

It is noted the second embossed portions 24 have a height larger than that of the first embossed portion 23 for protecting the first embossed portion 23 against collapse and damage due to an external pressure applied to the top surface 21 of the embossed leaf 2. The number of the second embossed portions 24 is not limited to two as shown in FIG. 2, but may be only one or more than two. A book designer may change the number and the shape of the second embossed portions 24 depending on the actual need in designing the book.

With the first embossed portion 23 provided on the leaf 2 corresponding to the illustration 22, the illustration 22 can be more accurately and lively expressed than in a book with flat leaves, making the book beautiful, unique, and practical for use. With the two spaced folding lines 13, the book body 1 is foldable without bringing the embossed illustration 22 to contact with the second inner surface 122; and with the second embossed portions 24, the embossed leaf 2 may be safely received in the book body 1 with the first embossed portion 23 and accordingly, the illustration 22, being effectively protected against collapse and damage under pressure. Therefore, the book with embossed leaves according to the present invention has good applicability and is convenient for storing and carrying.

FIGS. 6 through 10 show a variation of the book with embossed leaves according to the first preferred embodiment of the present invention shown in FIGS. 1 to 5. In the variation of the first preferred embodiment, there are two embossed leaves 2 separately attached to the first and the second inner surface 121, 122 of the book body 1 to increase the applicability of the book. Of course, the book designer may further increase the number of the book body 1 according to actual need in design to allow corresponding increase of the number of the embossed leaves 2.

Figure 11:
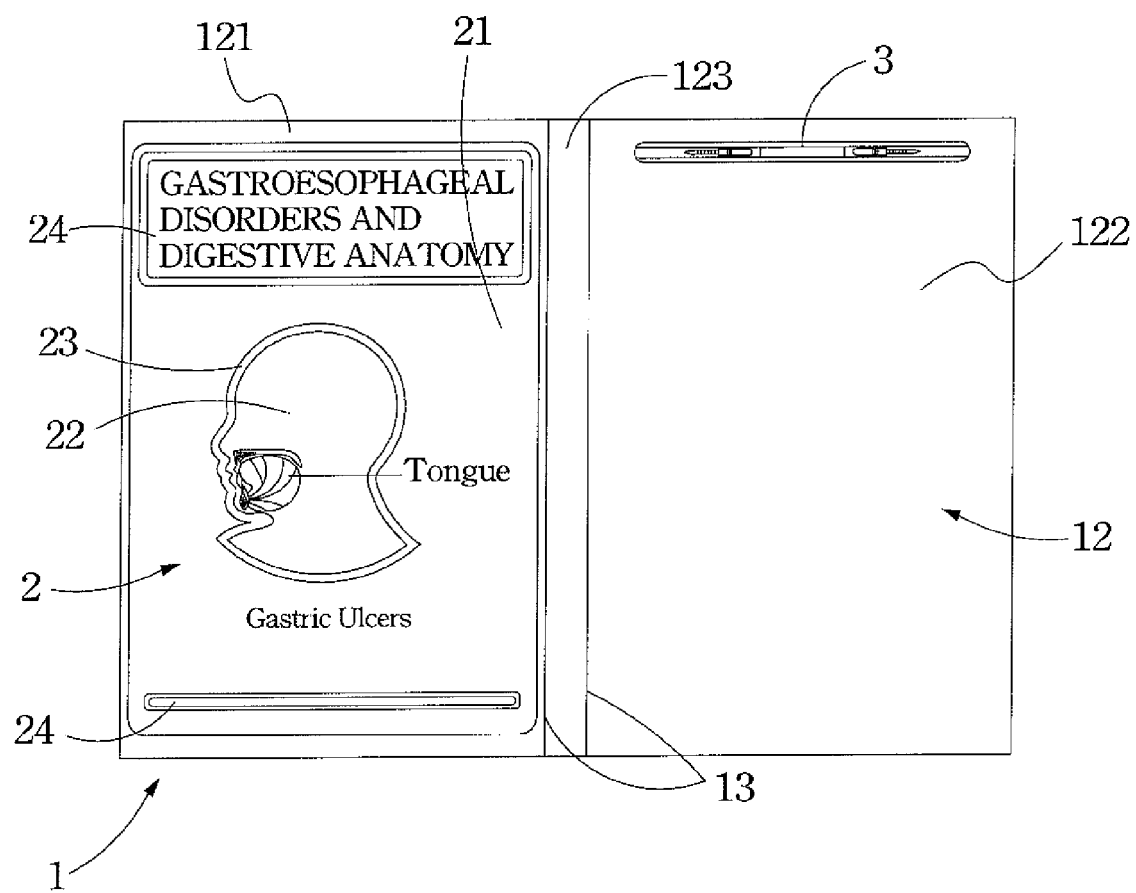
FIG. 11 is an assembled top view of a book with embossed leaves according to a second preferred embodiment of the present invention in an opened state.

Please refer to FIG. 11 that shows a book with embossed leaves according to a second preferred embodiment of the present invention. The book in the second embodiment of the present invention is generally structurally similar to that in the first embodiment, except for a clip device 3 for holding paper sheets to the book body 1.

The clip device 3 is mounted to one of the first and the second inner surface 121, 122. In the illustrated second preferred embodiment of the present invention, the clip device 3 is a two-hole loose-leaf clip mounted to a proper position on the second inner surface 122. However, it is understood other conventional types of clip mechanisms, such as a multi-hole loose-leaf clip, a spring clip, etc., may also be used in lieu of the two-hole loose-leaf clip. Since the clip device 3 is a known skill, it is not described in details herein.

With the clip device 3 provided in the book of the present invention for holding paper sheets thereto, the book with embossed leaves of the present invention is more practical for use.

Figure 12:
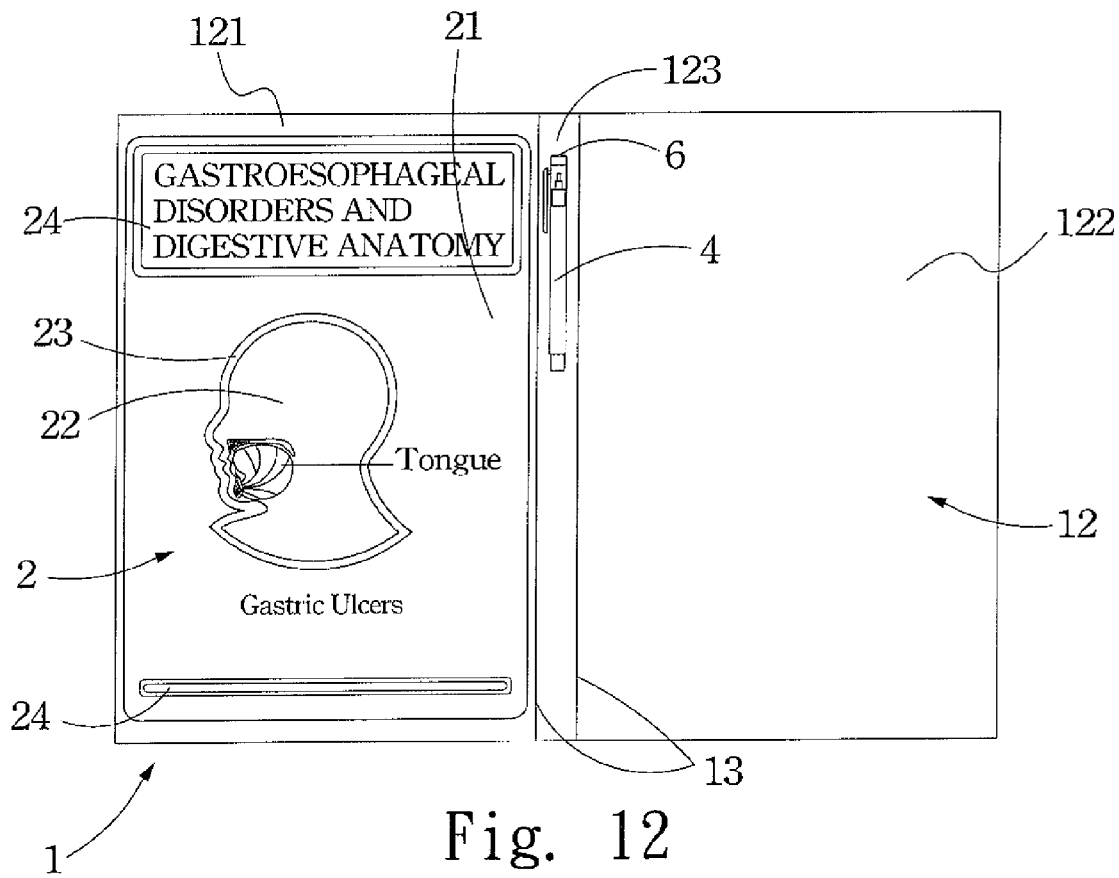
FIG. 12 is an assembled top view of a book with embossed leaves according to a third preferred embodiment of the present invention in an opened state.

Please refer to FIG. 12 that shows a book with embossed leaves according to a third preferred embodiment of the present invention. The book in the third embodiment of the present invention is generally structurally similar to that in the first embodiment, except for a water-based pen 4, a pen holding element 5 for holding the water-based pen 4 to the book body 1, and an erasing element 6 for erasing ink marks of the water-based pen 4 from the top surface 21 of the embossed leaf 2. Moreover, the leaf 2 for the book in the third embodiment of the present invention is correspondingly provided with a smooth-faced top surface 21, on which marks may be made with the water-based pen 4 and erased using the erasing element 6.

Figure 13:
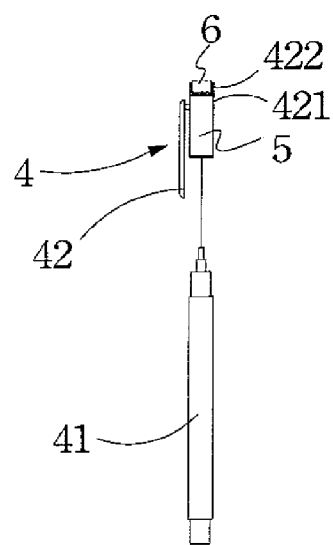
FIG. 13 is a partially exploded view showing a water-based pen, a pen holding element, and an erasing element included in the book according to the third preferred embodiment of the present invention.

As can be seen from FIG. 13, the water-based pen 4 includes a pen body 41, and a corresponding cap 42 for releasably covering a tip of the pen body 41. The cap 42 is provided at a rear side with a first recess 421 corresponding to the pen holding element 5 and at a top with a second recess 422 corresponding to the erasing element 6.

The pen holding element 5 is fixedly set in the first recess 421 on the cap 42. In the illustrated third embodiment of the present invention, the pen holding element 5 is a piece of double-sided foam-rubber tape. However, it is understood the pen holding element 5 may be implemented in any other known and applicable forms, such as a magnet or a pair of mating connectors.

The erasing element 6 is set in the second recess 422.

With the provision of the water-based pen 4, the pen holding element 5, and the erasing element 6 on the book body 1, the book with embossed leaves according to the present invention allows a user to conveniently make notes and/or marks on the embossed leaf 2, making the book of the present invention functionally excellent for use.

The book with embossed leaves according to the present invention has a foldable book body, and leaves provided with first embossed portions to highlight the illustrations printed thereon and second embossed portions to protect the first embossed portions against collapse and damage. These designs make the book of the present invention beautiful, unique, excellent in applicability, and easy to store and carry. Meanwhile, with the optional provision of clip device, water-based pen, pen holding element, and erasing element, the book of the present invention is highly practical for use.

The present invention has been described with some preferred embodiments thereof and it is understood that many changes and modifications in the described embodiments can be carried out without departing from the scope and the spirit of the invention that is intended to be limited only by the appended claims.

What is claimed is:

1. A book with embossed leaves, comprising:
 a book body having two opposite sides, namely, an outer side and an inner side, and two spaced folding lines formed at predetermined positions by pressing to divide the outer side into a front face, a back face, and a spine interconnecting the front face and the back face, and the inner side into a first inner surface corresponding to the front face, a second inner surface corresponding to the back face, and a connecting surface corresponding to the spine and interconnecting the first and the second inner surface; and
 at least one leaf attached to one of the first and the second inner surface of the book body, and including at least one illustration printed on a top surface of the leaf, at least one first embossed portion integrally produced on the leaf by vacuum forming to correspond to the at least one illustration and raise from the top surface of the leaf, and at least one second embossed portion integrally produced on the leaf by vacuum forming to space from the at least one first embossed portion and raise from the top surface of the leaf; and the second embossed portion being raised by a height larger than that of the first embossed portion to thereby protect the first embossed portion against collapse and damage by external pressure.

2. The book with embossed leaves as claimed in claim 1, further comprising a clip device mounted to one of the first and the second inner surface of the book body for holding paper sheets thereto.

3. The book with embossed leaves as claimed in claim 1, wherein the top surface of the embossed leaf is smooth-faced, on which notes and marks may be erasably made with a water-based pen.

4. The book with embossed leaves as claimed in claim 3, further comprising a water-based pen, and a pen holding element for holding the water-based pen to the book body.

5. The book with embossed leaves as claimed in claim 4, further comprising an erasing element assembled to the water-based pen for erasing notes and marks made on the embossed leaf with the water-based pen.

6. The book with embossed leaves as claimed in claim 4, wherein the water-based pen includes a pen body and a cap for releasably covering a tip of the pen body; and the cap being formed at a rear side with a first recess corresponding to the pen holding element for the pen holding element to set therein.

7. The book with embossed leaves as claimed in claim 5, wherein the water-based pen includes a pen body and a cap for releasably covering a tip of the pen body; and the cap being formed at a top with a second recess corresponding to the erasing element for the erasing element to set therein.

* * * * *